Jan. 28, 1936. B. M. LEECE ET AL 2,029,266
REGULATOR
Filed Oct. 30, 1931
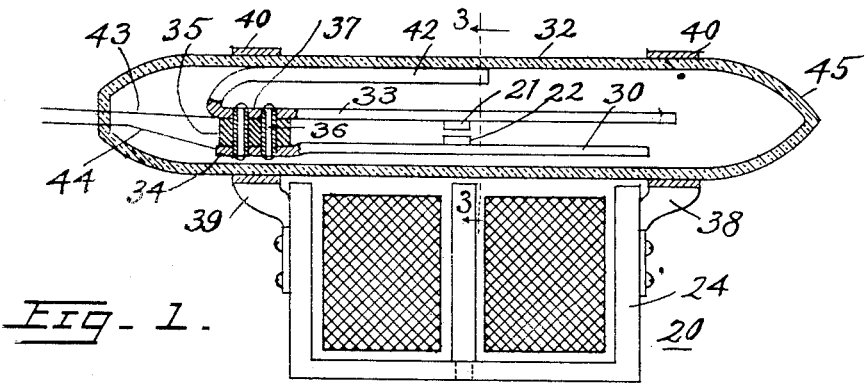
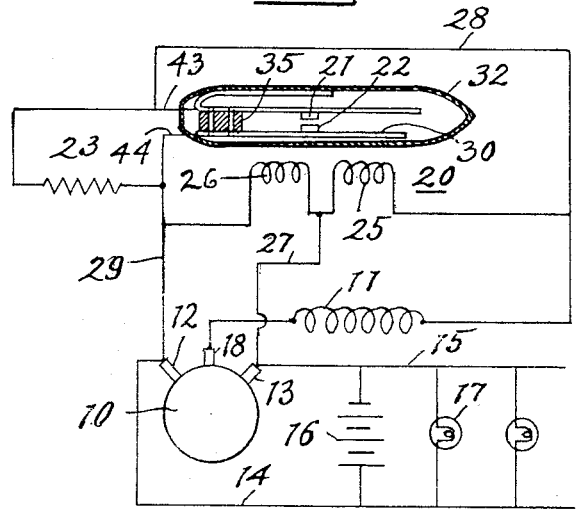
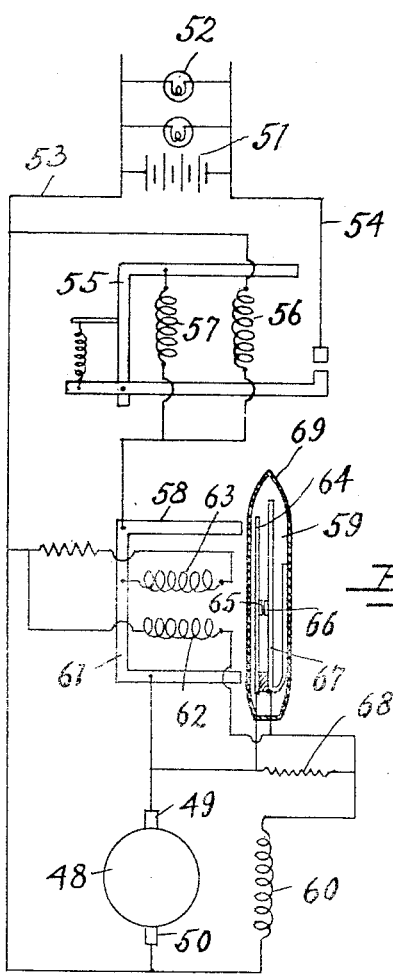
Inventors.
BENNETT M. LEECE
DALE S. COLE.
Kwis Hudson & Kent
Attys.

Patented Jan. 28, 1936

2,029,266

UNITED STATES PATENT OFFICE 2,029,266

REGULATOR

Bennett M. Leece, Cleveland, and Dale S. Cole, Cleveland Heights, Ohio, assignors to The Leece-Neville Company, Cleveland, Ohio, a corporation of Ohio Application October 30, 1931, Serial No. 572,042

3 Claims. (Cl. 200—87)

This invention relates to generating systems for vehicle lighting, battery charging and other purposes, and more particularly to a novel form of regulator for such systems.

An object of this invention is to provide a novel form of regulator embodying a make and break device which is enclosed in an air-tight envelope.

Another object of this invention is to provide a regulator of the electromagnetic type having a vibratory element disposed in an air-tight envelope.

A further object of this invention is to provide regulating means for a generating system, wherein electromagnetically actuated contact means for altering the excitation of the generator field, is disposed in a hermetically sealed envelope.

Other objects and advantages of this invention will be apparent from the following description, when taken in conjunction with the accompanying sheet of drawing, wherein, Fig. 1 is a sectional elevation taken through a regulating device constructed according to our invention.

Fig. 2 is a diagrammatic illustration of a generating system embodying the regulator shown in Fig. 1.

Fig. 3 is a sectional view taken on line 3—3 of Fig. 1, and

Fig. 4 is a diagram of another generating system embodying our regulating means.

In general the regulating device of our invention is of the vibratory armature type, which is especially suitable for use with the generating systems provided on motor vehicles. In the operation of this type of regulator, the voltage output of the generator is maintained at a substantially constant value by controlling the excitation of the generator field. Regulators of this general type are well known in the art, one such device being disclosed in United States Patent No. 1,540,698, issued June 2, 1925, over which the present arrangement is an improvement. In the drawing, to which detailed reference will presently be made, we have illustrated the preferred forms of our regulating means as being used in conjunction with generating systems intended for vehicle lighting and battery charging purposes, it should be understood, however, that the principle of our invention may be embodied in various other electrical devices.

In Fig. 2 of the drawing, we have shown our regulating means embodied in a generating system of the type commonly employed on motor vehicles for lighting and battery charging purposes. This system is provided with a direct current generator having an armature 10, and a shunt field winding 11. Current is taken off the armature 10 through the main brushes 12 and 13, and is delivered through the main conductors 14 and 15 for various uses, such as charging the storage battery 16, operating the incandescent lamps 17, and other purposes. Excitation of the field 11 is obtained, in this instance, by providing an auxiliary brush 18, commonly referred to as a third brush, which cooperates with the armature 10 at some point intermediate the main brushes 12 and 13.

For controlling the excitation of the field 11, and thereby regulating the voltage output of the generator, we provide an electromagnet 20, having cooperating contact elements 21 and 22, which serve to intermittently connect a resistance 23, of suitable value, in series with the field winding. As is well understood in the art, the electromagnet 20 may comprise a suitable frame 24, formed of magnetizable material, and a magnetizing winding composed of coils 25 and 26 in additive relation. The coil 25 constitutes an operating coil having one end thereof connected to the brush 13 by means of the conductor 27, and the other end thereof connected with the stationary contact element 21 through the conductor 28, and thence to the brush 12, either through the contact element 22 and the conductor 29, or through the resistance element 23 and the conductor 29. The coil 26 is a shunt coil having the ends thereof connected to the brushes 12 and 13 through the conductors 27 and 29. As explained in detail in the patent referred to above, the operating coil 25 is connected to the brushes 12 and 13 through the cooperating contacts 21 and 22, so that during the operation of the generator this coil will be energized, and will cause the armature 30, which carries the contact element 22, to be rapidly vibrated. This vibratory movement of the armature causes the resistance element 23 to be intermittently cut into, and short-circuited out of the field circuit. The coil 26 being in shunt relation across the brushes 12 and 13, responds to changes in the voltage output of the generator to correspondingly increase or decrease the rate of vibration of the armature 30.

As thus far described, our regulating means is of well known construction, but according to our invention we provide the same with a novel form of make and break device, wherein the cooperating contact elements 21 and 22 are arranged in an air-tight envelope 32 which is disposed in the field of the electromagnet 20. This air-tight enclosing envelope may consist of a sealed tube of any desirable shape, which may be formed of glass or other suitable non-magnetic material. For supporting the stationary contact element 21 within the envelope, we provide the supporting member 33 which is formed of suitable non-magnetic material, such as spring brass. The movable contact element 22 is carried by the vibratory armature 30, which may be formed of a suitable magnetizable material, such as spring steel or the like. The vibratory armature may be supported within the envelope by having the end portion 34 thereof clamped to the supporting element 33. In clamping the armature to the supporting element, we employ an insulating block 35 of suitable size and shape, and one or more clamping screws or rivets 36, which extend through the insulating block and through the supporting element and armature. Passage of current through these clamping members may be prevented by employing suitable insulating means, such as the insulating bushings 37 surrounding the clamping rivets 36.

The envelope 32 is shown in this instance as being round in cross-sectional shape, but it should be understood that this member may have any suitable shape which will position the vibratory armature 30 close to the poles of the frame 24. Our make and break device may be supported within the magnetic field of the electromagnet 20 by any suitable means, and, if desired, simple supporting clamps 38 and 39 may be mounted upon the frame 24 and provided with band portions 40 which encircle the envelope, as shown in Fig. 1.

In order that the assembly, formed by the armature 30 and supporting element 33, may be firmly supported within the envelope without looseness or rattling, we have so arranged and proportioned the parts of this assembly that the latter fits snugly within the envelope with portions thereof bearing against the inner surface of the enclosing wall. To this end we have constructed the supporting member 33 with the reversely bent spring leg 42 for engagement with the inner wall of the envelope, and have so proportioned the insulating block 35 that the corner portions thereof engage the inner surface of the envelope at points spaced circumferentially from the spring leg 42. Additional support may be provided for this assembly, by making the body portion of the supporting element 33 sufficiently wide so that the edges thereof also engage the inner surface of the wall of the envelope. An arrangement such as that just described, is clearly illustrated in Fig. 3 of the drawing, and from this arrangement it will be seen that the assembly is snugly fitted within the envelope, but with the armature 30 out of contact with the enclosing wall and free for vibratory movement.

As stated above, the enclosing envelope 32 of the make and break device is air-tight. If desired this envelope may be evacuated to any desired degree, so that the vibratory movement of the armature 30 will meet with little or no air resistance, with the result that the armature 30 may be made very light in weight, and a very high frequency of armature beat may be attained. In certain instances it may be desirable to provide an atmosphere of nitrogen, or other inert gas, within the hermetically sealed envelope. The presence of such gas might be desirable within the envelope as a means for quenching the arc produced upon the opening of the contact elements.

The enclosing envelope of our make and break device may be constructed according to any suitable method or process, but is preferably of simple form with the conductors 43 and 44, which are provided for the contact elements 21 and 22, extending through and sealed in the glass or other material forming the wall of the envelope. After the desired pressure condition or gaseous atmosphere has been established within the envelope, the same may be hermetically sealed in any efficient manner, such as by fusing the material at the pointed end 45.

In Fig. 4 of the drawing we have shown another generating system embodying our novel regulator construction, wherein the generator 48 is of the two brush type. In this system, current delivered by the brushes 49 and 50 of the generator, is supplied to the storage battery 51 and lamps 52 as by means of the main conductors 53 and 54. This system also includes a reverse current cut-out 55, which is of well known construction and comprises, in general, a shunt coil 56 and a series coil 57. A regulator 58, which embodies our novel form of make and break device 59, controls the excitation of the shunt field winding 60 of the generator 48, to thereby maintain the output of the generator at a substantially constant value. The regulator itself comprises a frame 61 having a magnetizing winding which is composed of the operating coil 62 and the shunt coil 63 in additive relation. These coils perform the same functions as the coils 25 and 26, shown in Fig. 2, the operating coil 62 serving as a means for actuating the vibratory armature 64, while the shunt coil 63 regulates the rate of vibration of the armature in accordance with the operation of the generator. The armature 64 carries a movable contact 65 which cooperates with a stationary contact 66 carried by a supporting element 67. The vibration of the armature 64 causes the resistance element 68 to be intermittently cut into and short circuited out of the circuit of the field winding 60, as is well understood in the art.

According to our invention the contact elements 65 and 66, which are supported respectively by the armature 64 and the member 67, are disposed within a hermetically sealed envelope 69. This envelope is supported adjacent the frame 58 of the regulator, so that the armature 64 will be efficiently actuated in response to the magnetization produced by the coils 62 and 63.

Adjustment of the operation of our make and break device may be provided by increasing or decreasing the air gap between the poles of the magnet frame and the vibratory armature 30, or, if desired, the make and break device may be removed from the supporting brackets 38 and 39 and a different device substituted, wherein the vibratory armature may be different, as to dimensions or character of material. The rate of vibration of the armature may also be controlled, to some extent, by the existent pressure condition, or character of the confined gas, within the enclosing envelope, and in various other ways, such as by varying the magnetizing value of the coils of the electromagnet, the value of the field resistance element, the dimensions of the metallic parts within the envelope, and also by varying the character of the material forming the vibratory armature.

It will now be readily seen that we have provided a novel form of regulator embodying a simple and efficient form of make and break device. In the construction which we have provided, the enclosing of the contact elements within a hermetically sealed envelope, eliminates interference heretofore produced by air, moisture and foreign matter, thereby increasing the sensitiveness of the device, and making possible the use of a vibratory armature, which is of very light weight and therefore not easily affected by jarring or vibration transmitted from the vehicle, or other supporting structure, upon which the regulator is mounted. Moreover, it will be seen that since the contact elements are opened and closed in a vacuum or inert gas, depending upon which condition exists within the envelope, it will be seen that whatever arc may be formed will not cause destructive oxidation, and a stable and efficient condition of the contact elements will be maintained over a long period of usage. It will also be seen, furthermore, that since the contact elements are enclosed within a hermetically sealed envelope they are protected against damaging blows, foreign material, moisture and the tampering action of inexperienced persons.

While we have illustrated and described the device of our invention in a detailed manner, it should be understood, however, that we do not intend to limit ourselves to the precise arrangements of parts and details of construction illustrated and described, but regard our invention as including such changes and modifications as do not involve a departure from the spirit of the invention and the scope of the appended claims.

Having thus described our invention what we claim is:

1. In an electromagnetic device of the character described the combination of a frame, a magnet winding on said frame, and a circuit control device responsive to magnetization produced by said winding, said control device comprising an elongated air tight envelope, a support wholly enclosed in said envelope and retained in place therein by engagement with the wall of the envelope at peripherally spaced areas which extend for a substantial distance along the wall of the envelope, a contact on said support, and a vibratory armature in the envelope for cooperation with said contact.

2. In an electromagnetic device of the character described the combination of a frame, a magnet winding on said frame, and a circuit control device responsive to magnetization produced by said winding, said control device comprising a non-magnetic envelope, a support wholly enclosed in said envelope and having a body part engaging the wall of the envelope at spaced points and a spring part engaging the wall of the envelope and biasing said body part against said wall, a contact on said support, and a vibratory armature carried by said support and adapted for cooperation with said contact.

3. In an electromagnetic device of the character described the combination of a frame, a magnet winding on said frame, and a circuit control device responsive to magnetization produced by said winding, said control device comprising an elongated air tight envelope of substantially circular cross-section, an elongated support wholly enclosed in said envelope, said support having a relatively wide body portion engaging opposite sides of the wall of the envelope and a relatively narrow resilient portion engaging the envelope wall and biasing said wide portion against said wall, a contact on said wide body portion, and an elongated vibratory armature carried by said support and having a contact for cooperation with the first mentioned contact.

BENNETT M. LEECE.
DALE S. COLE.